US008020583B2

(12) United States Patent
Christensen et al.

(10) Patent No.: US 8,020,583 B2
(45) Date of Patent: Sep. 20, 2011

(54) HYDRAULIC VALVE ARRANGEMENT

(75) Inventors: Thorkild Christensen, Soenderborg (DK); Siegfried Zenker, Kirchseeon (DE)

(73) Assignee: Sauer-Danfoss Aps, Nordborg (DE)

( * ) Notice: Subject to any disclaimer, the term of this patent is extended or adjusted under 35 U.S.C. 154(b) by 892 days.

(21) Appl. No.: 11/956,770

(22) Filed: Dec. 14, 2007

(65) Prior Publication Data

US 2008/0223456 A1 Sep. 18, 2008

(30) Foreign Application Priority Data

Dec. 20, 2006 (DE) ........................ 10 2006 060 334

(51) Int. Cl.
*F16K 17/18* (2006.01)

(52) U.S. Cl. ......................... 137/493; 137/596; 137/884

(58) Field of Classification Search .................. 137/269, 137/884, 493, 271, 596; 91/446, 447
See application file for complete search history.

(56) References Cited

U.S. PATENT DOCUMENTS

| | | | | |
|---|---|---|---|---|
| 3,982,469 | A | 9/1976 | Bianchetta | |
| 4,779,419 | A | 10/1988 | Crosser | |
| 5,000,001 | A | 3/1991 | Christensen et al. | |
| 5,077,972 | A | 1/1992 | Bianchetta et al. | |
| 5,501,136 | A | 3/1996 | Wennerbo et al. | |
| 5,778,930 | A * | 7/1998 | Friedrichsen et al. | 137/884 |
| 5,806,312 | A | 9/1998 | Kauss et al. | |
| 5,950,429 | A | 9/1999 | Hamkins | |
| 6,094,911 | A | 8/2000 | Crawshaw | |
| 6,854,270 | B2 * | 2/2005 | Zenker et al. | 91/446 |
| 7,080,663 | B2 * | 7/2006 | Kauss et al. | 137/625.66 |

FOREIGN PATENT DOCUMENTS

| | | | |
|---|---|---|---|
| DE | 3841507 | C1 | 6/1989 |
| DE | 4243973 | C1 | 7/1994 |
| DE | 69822109 | T2 | 6/1999 |
| DE | 10308289 | A1 | 9/2004 |

* cited by examiner

*Primary Examiner* — Kevin L Lee

(74) *Attorney, Agent, or Firm* — McCormick, Paulding & Huber LLP

(57) ABSTRACT

The invention concerns a hydraulic valve arrangement (1) with at least two valve modules (2-6), each having a supply channel arrangement with a high-pressure channel (9) and a low-pressure channel (15), a working connection arrangement with at least one working connection (A, B), one directional valve arrangement (16) between the supply channel arrangement (9, 15) and the working connection arrangement (A, B) and a compensation arrangement (19), which is acted upon by a pressure in a load-sensing arrangement. It is endeavored to increase the number of control possibilities. For this purpose, the load-sensing arrangement of at least one valve module (2-6) has a pressure influencing arrangement (25-29) that differs from a pressure influencing arrangement (25-29) of a load sensing arrangement of another valve module (2-6).

10 Claims, 1 Drawing Sheet

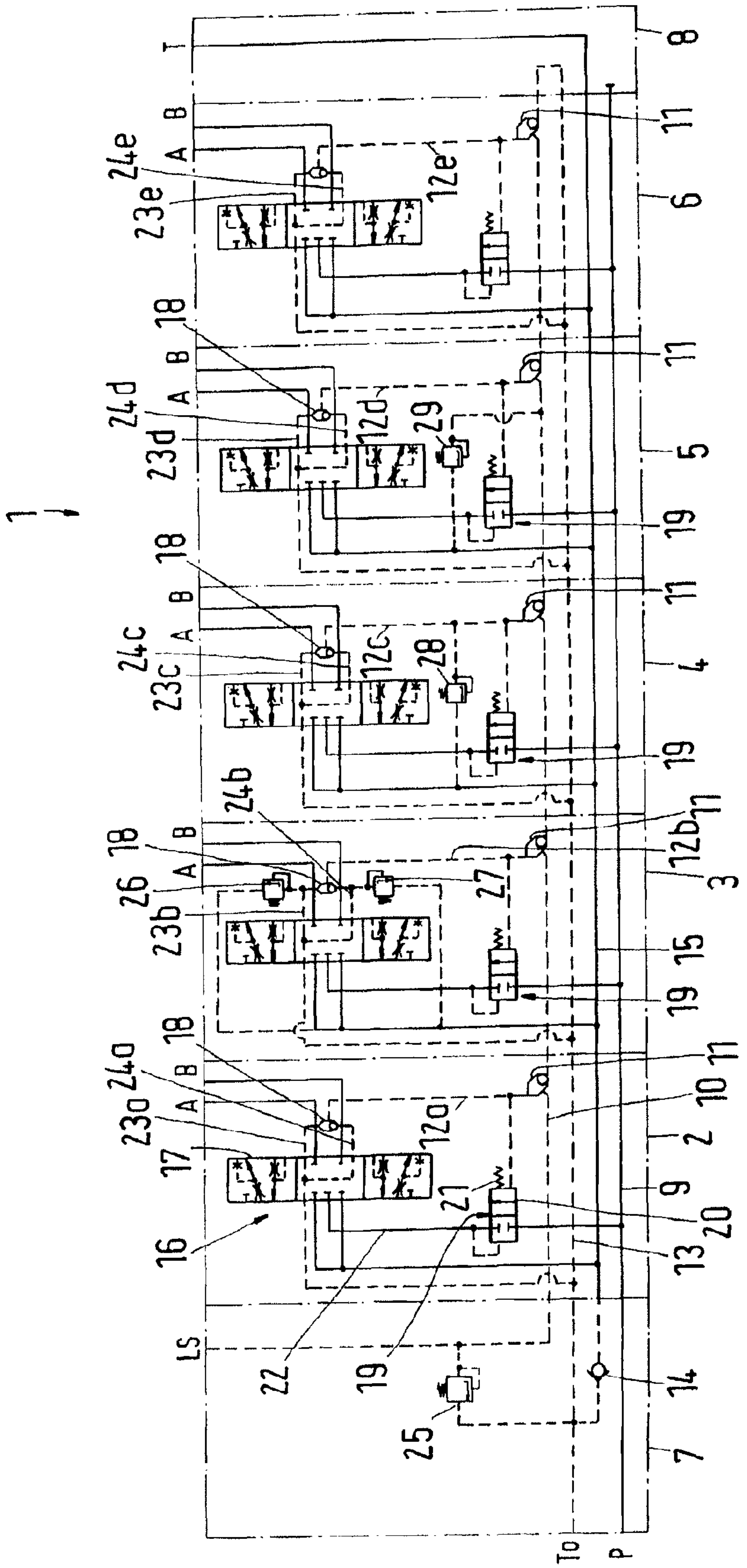
1
T
A
B
P
To
LS
8
6
5
4
3
2
7
9
10
11
12a
12b
12c
12d
12e
13
14
15
16
17
18
19
20
21
22
23a
23b
23c
23d
23e
24a
24b
24c
24d
24e
25
26
27
28
29

HYDRAULIC VALVE ARRANGEMENT

CROSS REFERENCE TO RELATED APPLICATION

Applicant hereby claims foreign priority benefits under U.S.C. §119 from German Patent Application No. 10 2006 060 334.6 filed on Dec. 20, 2006, the contents of which are incorporated by reference herein.

FIELD OF THE INVENTION

The invention concerns a hydraulic valve arrangement with at least two valve modules, each having a supply channel arrangement with a high-pressure channel and a low-pressure channel, a working connection arrangement with at least one working connection, one directional valve arrangement between the supply channel arrangement and the working connection arrangement and a compensation arrangement, which is acted upon by a pressure in a load-sensing arrangement.

BACKGROUND OF THE INVENTION

Such a hydraulic valve arrangement is used in vehicles, working machines, plant or the like, in which several hydraulic actuators or drives shall be controlled. In this connection, each valve module is allocated to a drive. In order to simplify the supply, the valve modules are usually flanged together, so that the supply channel arrangement has a high-pressure channel and a low-pressure channel extending through all valve modules. In dependence of the drive used, each valve module then has one or two working connections, which are controlled by the directional valve arrangement. In many cases, the directional valve arrangement also causes an amount control of the hydraulic fluid supplied to the working connections. In order to simplify this amount control, the compensation arrangement is provided, which ensures that the pressure over the directional valve arrangement, or rather a measuring orifice in or at the directional valve arrangement, remains constant. One working connection is needed, if a single-acting drive is used that can, for example, only lift a load. Two working connections are needed, if a double-acting drive is used.

One example of a compensation arrangement is formed by a compensation valve, which is acted upon in the opening direction by the force of a spring and the pressure in a load-sensing pipe and in the closing direction by the pressure after the compensation valve.

In many cases, it is desired to limit the maximum opening pressure for this compensation valve and thus the maximum pressure at the working connection. For this purpose, a pressure limiting valve is often used, which opens at a too high pressure and lets hydraulic fluid flow off, until the desired pressure has been reached.

SUMMARY OF THE INVENTION

The invention is based on the task of increasing the control possibilities of a hydraulic valve arrangement.

With a hydraulic valve arrangement as mentioned in the introduction, this task is solved in that the load-sensing arrangement of at least one valve module has a pressure influencing arrangement that differs from a pressure influencing arrangement of a load sensing arrangement of another valve module.

With this embodiment it is easier to specifically act upon the pressure setting of the compensation arrangement. It is not required to control all valve modules in the same way. This does not, or not only, concern a pressure value that can be set by the compensation arrangement. This pressure can, for example, be changed in that the pressure compensation arrangements have different spring forces. It rather concerns the control of the compensation arrangements. Also here different controls can consider demands of the individual drives.

Preferably, the pressure influencing arrangement of one valve module has a pressure limiting valve that is common for all valve modules, said pressure limiting valve being connected to a load-sensing main pipe extending through all valve modules. In this case, the highest load-sensing pressure can be set at a predetermined value, which will then be responsible for the control of the compensation arrangement.

It is preferred that the pressure limiting valve is located in an inlet module. In many cases, the inlet module is available anyway, to provide a pressure connection from which the high-pressure channel is supplied. Locating the pressure limiting valve in the inlet module is thus a relatively simple way of keeping it available for all valve modules.

In a preferred embodiment, it is provided that in a valve module with two working connections a load-sensing pipe section is allocated to each working connection and that the pressure influencing arrangement in this valve module has one pressure limiting valve in each load-sensing pipe section. In this case, the compensation arrangement can even be operated in dependence of the pressure in the related working connections. This can, for example, be advantageous in connection with a gripping device, for which the maximum pressure in the gripping direction must be lower than in the opposite direction in order not to damage the goods to be gripped. Other drives, which are connected to the same valve arrangement, must, for example, be able to work with a higher or a lower maximum pressure. This is possible because of the individual setting possibility of the load sensing pressured in the individual working connections.

It is preferred that the compensation arrangement is connected to an outlet of a two-way valve, whose inlets are connected to the pressure limiting valves. The two-way valve then leads the higher of the two pressures set by the pressure limiting valves to the compensation arrangement.

Preferably, in a valve module with two working connections a load-sensing pipe section is allocated to each working connection and the load-sensing pipe sections are connected to the compensation arrangement via a two-way valve, the pressure influencing arrangement having a pressure limiting valve that branches off from a pipe from the outlet of the two-way valve. In this case, the compensation arrangement is acted upon by the higher of the two load pressures at the working connections, which again can be limited to a certain value by the pressure influencing arrangement. However, the pressure limit value of this valve module can be set independently of a pressure limit value in another valve module.

Preferably, in a valve module the compensation arrangement is connected to a load-sensing pipe section and the pressure influencing arrangement has a pressure limiting valve that branches off from the load-sensing main pipe. In this case, the compensation arrangement can also be controlled by a load-sensing pressure in another valve module. Thus, dependencies can be generated between the individual drives, which are controlled by the valve modules.

Preferably, the load-sensing main pipe has a two-way valve for each valve module, the two-way valve passing on the higher pressure from either the valve module or a neighbouring valve module to the load-sensing main pipe, the pressure limiting valve branching off behind the outlet of the two-way valve. In this case, it can be ensured that after a certain position in the load-sensing main pipe the compensation valves of all subsequent valve modules are controlled by the pressure limiting valve.

This is particularly the case, if the pressure control arrangement of one valve module comprises the pressure limiting valve of another valve module branching off from the load-sensing main pipe, said pressure limiting valve being located in a two-way valve cascade in the load-sensing main pipe further below. In this case, only one single pressure limiting valve will be required for a plurality of valve modules. This pressure limiting valve reduces the highest pressure existing in the cascade to a predetermined value. The compensation arrangement can then only be controlled by this reduced value.

With a valve arrangement as mentioned in the introduction, the task is also solved in that the pressure influencing arrangement of a valve module comprises a pressure limiting valve of another valve module that branches off from the load-sensing main pipe, said pressure limiting valve being located in a two-way valve cascade in the load-sensing main pipe further below. In this case, a group of valve modules can be used by the pressure limiting valve located in the two-way valve cascade further below to control the pressure for the compensation arrangements of all valve modules comprised by the group.

With a valve arrangement as mentioned in the introduction, the task is also solved in that in a valve module with two working connections a load-sensing pipe section is allocated to each working connection and the load-sensing pipe sections are connected to the compensation arrangement via a two-way valve, the pressure influencing arrangement having a pressure limiting valve that branches off from a pipe from the outlet of the two-way valve. In this case, the same pressure control can be provided for both working connections.

BRIEF DESCRIPTION OF THE DRAWINGS

In the following, the invention is described on the basis of a preferred embodiment in connection with the drawing, showing:

Only FIGURE is a schematic view of a hydraulic valve arrangement.

DETAILED DESCRIPTION OF THE PREFERRED EMBODIMENTS

In the present embodiment, a hydraulic valve arrangement 1 has five valve modules 2-6, which are flanged together to form a block. In other words, the valve modules 2-6 are located side by side, next to each other. Their connections in the sides located next to each other correspond to each other.

An inlet module 7 is flanged onto one side of the block and an end module 8 is flanged onto the other side of the block. The inlet module 7 has a high-pressure connection P, which is connected to a high-pressure channel 9 that extends through all valve modules 2-6.

Further, the inlet module 7 has a load-sensing connection LS that is connected to a load-sensing main pipe 10, which also extends through all the valve modules 2-6 and also through the end module 8. A cascade of two-way valves 11 is located in the load-sensing main pipe. The load-sensing main pipe 10 is connected to the outlet and one inlet of each two-way valve 11. Each of the other inlets of the two-way valves 11 is connected to a pipe 12*a*-12*e*, which can have different embodiments in the individual valve modules 2-6. In the cascade, the inlet module 7 is "at the bottom" and the end module 8 is "at the top".

Through the end module 8 the load-sensing main pipe 10 is connected to a T0-pipe 13, which is connected to a T0-port in the inlet module 7. Via a non-return valve 14 the T0-pipe 13 is connected to a low-pressure pipe 15, which leads to a low-pressure connection T in the end module 8. A pump or another pressure source can be connected to the high-pressure connection P. A tank or another container can be connected to the low-pressure connection T.

The valve modules 2-6 have corresponding designs in that each valve module has a directional valve arrangement 16 with a slide 17, which, in the neutral position shown, interrupts a connection between the high-pressure channel 9 and the low-pressure channel 15 on the one side and two working connections A, B on the other side. In this neutral position the pipe 12*a*-12*e* is connected via a two-way valve 18 to the T0 pipe, so that in the neutral position practically the pressure at the low-pressure connection T or T0 rules in the pipes 12*a*-12*e*.

The slide 17 can be displaced to two working positions. In one working position the working connection A is connected to the high-pressure channel 9 via a compensation valve 19 and the working connection B is connected to the low-pressure channel 15. In the other working position the working position B is connected to the high-pressure channel 9 and the working connection A is connected to the low-pressure channel 15.

The compensation valve 19 has a compensation slide 20, which is acted upon in the opening direction by a spring 21 and the pressure in the pipe 12*a*-12*e* concerned and in the closing direction by the pressure in a pipe section 22, which is located between the compensation valve 19 and an inlet of the directional valve arrangement 16. The inlet of the compensation valve 19 is connected to the high-pressure channel 9.

The compensation valve 19 ensures that a pressure drop over the directional valve arrangement 16, or rather over a measuring orifice arrangement in the directional valve arrangement 16, is so large that it corresponds to the force of the spring 21. This applies at least for as long as specific pressure conditions are maintained.

In brief, the compensation valve 19 works as follows: As long as the directional valve arrangement 16 is in the neutral position, both the pipes 12*a*-12*e* and the pipe section 22 are pressureless. The compensation slide 20 is moved to the opening position by the spring 21 and then adjusts so that the pressure in the pipe section 22 corresponds to the force of the spring 21.

When the directional valve arrangement 16 is activated, the pressure at one of the working connections A, B, and thus also in a load-sensing pipe section 23*a*-23*e*, 24*a*-24*e*, increases. This pressure is now utilised and modified in different ways to activate the compensation valve 19.

In the valve module 2 the higher of the two pressures in the load-sensing pipe sections 23*a*, 24*a* gets immediately to the pipe 12*a* via the two-way valve 18. From here the pressure reaches the valve slide 20 in the opening direction, so that the compensation valve 19 opens. A pressure limitation takes place in that a pressure limiting valve 25 branches off from the load-sensing main pipe in the inlet module 7, said valve 25 limiting the pressure in the load-sensing main pipe 10 to a predetermined value. This also limits the pressure, with which the compensation slide 20 can be displaced in the opening direction, and an automatic pressure limitation at the working connections A, B of the valve module 2 occurs.

This is a first opportunity of influencing the compensation valve 19 of a valve module so that a predetermined pressure at the working connections A, B is not exceeded.

In the valve module 3 another opportunity has been chosen. Here, each load-sensing pipe section 23*b*, 24*b* comprises a pressure limiting valve 26, 27, so that the maximum pressure ruling at the inlets of the two-way valve 18 can be limited in dependence of the direction, in which the motor connected to the working connections A, B is activated. If, for example, a gripping device is connected to the working connections A, B of the valve module 3, it can be ensured that in the closing direction the gripping device can be operated with a lower maximum pressure than in the opening direction.

If the pressure in the load sensing pipe section 23*b*, 24*b* exceeds the value preset by the pressure limiting valve 26 or 27, the pressure limiting valve 26, 27 limits this pressure, so that only this limited pressure can be used to open the compensation valve 19. Accordingly, also the pressure in the two working connections A, B is individually limited. This means that the valve module 3 has an individual pressure limitation.

In the valve module 4, the compensation valve 19 is acted upon in a similar manner. However, here only one pressure limiting valve 28 is available that branches off from the pipe 12*c*. Via the two-way valve 18, the pipe 12*c* carries the higher of the two pressures in the load-sensing pipe sections 23*c*, 24*c*. Thus, it is possible to set the same maximum pressure for both working connections A, B.

In the valve module 5, the compensation valve 19 is also controlled by the pressure in the pipe 12*d*, which is connected to the two-way valve 18 that receives the higher of the two pressures from the load-sensing pipe sections 23*d*, 24*d*. However, here a pressure limiting valve 29 is connected to the load-sensing main pipe 10 and limits the pressure in the load-sensing main pipe of this valve module 5. Reducing the pressure in the load-sensing main pipe 10 also reduces the pressure in the pipe 12*d* via the two-way valve 11, so that the compensation valve 19 is opened accordingly less in the opening direction.

This pressure reduction propagates via the two-way valve 11 of the valve module 5 into valve module 6 connected further upwards in the two-way valve cascade of the two-way valves 11, so that also in the pipe 12*e* of the valve module 6 a correspondingly reduced pressure rules. In the modules 2-4 arranged further downwards in the two-way valve cascade of the two-way valves 11; however, the pressure reduction in the load-sensing main pipe 10 has no effect.

In the embodiment shown in the FIGURE, the valve arrangement has several valve modules 2-6, all having different pressure influencing arrangements, in order to control the compensation valves 19 in such a manner that a pressure limitation occurs in different ways.

However, it is also possible not to make all valve modules 2-6 in different manners, but, for example, only to have two different kinds of valve modules in one valve arrangement 1.

Also, only valve modules 4 can be put together, which have a common pressure limiting valve 28 for both working connections A, B.

It is also possible only to put together valve modules 5, 6, so that in the valve module 5 a pressure control arrangement is provided in the form of the pressure limiting valve 29, which acts upon the valve modules located further upwards in the two-way valve cascade.

In all cases it can be ensured that basically only little fluid is lost by the working connections A, B, when the compensation valves 19 are activated, as the corresponding pressures are only branched off as signal pressures from the load-sensing pipes, not, however, from the working pipes.

All valve modules 2-6 are shown with two working connections A, B. In many cases, in which only a single-acting hydraulic drive is connected to a valve module 2-6, it may happen that also one working connection will be sufficient, or it will be sufficient to activate only one working connection, whereas the other working connection is simply connected to the low-pressure pipe 15. This depends on the hydraulic drives used.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic valve arrangement comprising:

at least two valve modules, each having a supply channel arrangement with a high-pressure channel and a low-pressure channel, a working connection arrangement with at least one working connection, one directional valve arrangement between the supply channel arrangement and the working connection arrangement and a compensation arrangement, which is acted upon by a pressure in a load-sensing arrangement that includes at least one load-sensing pipe section, wherein a load-sensing arrangement of at least one valve module has a pressure influencing arrangement that differs from a pressure influencing arrangement of a load sensing arrangement of another valve module, wherein the pressure influencing arrangement of one valve module has a pressure limiting valve that is common for all valve modules, said pressure limiting valve being connected to a load-sensing main pipe extending through all valve modules.

2. The valve arrangement according to claim 1, wherein the pressure limiting valve is located in an inlet module.

3. A hydraulic valve arrangement comprising:

at least two valve modules, each having a supply channel arrangement with a high-pressure channel and a low-pressure channel, a working connection arrangement with at least one working connection, one directional valve arrangement between the supply channel arrangement and the working connection arrangement and a compensation arrangement, which is acted upon by a pressure in a load-sensing arrangement that includes at least one load-sensing pipe section, wherein a load-sensing arrangement of at least one valve module has a pressure influencing arrangement that differs from a pressure influencing arrangement of a load sensing arrangement of another valve module, and wherein the compensation arrangement is connected to an outlet of a two- way valve, whose inlets are connected to the pressure limiting valves.

4. A hydraulic valve arrangement comprising:

at least two valve modules, each having a supply channel arrangement with a high-pressure channel and a low-pressure channel, a working connection arrangement with at least one working connection, one directional valve arrangement between the supply channel arrangement and the working connection arrangement and a compensation arrangement, which is acted upon by a pressure in a load-sensing arrangement that includes at least one load-sensing pipe section, wherein a load-sensing arrangement of at least one valve module has a pressure influencing arrangement that differs from a pressure influencing arrangement of a load sensing arrangement of another valve module, and wherein in a valve module with two working connections a load-sensing pipe section is allocated to each working connection and the load-sensing pipe sections are connected to the compensation arrangement via a two-way valve, the pressure influencing arrangement having a pressure limiting valve that branches off from a pipe from the outlet of the two-way valve.

5. A hydraulic valve arrangement comprising:

at least two valve modules, each having a supply channel arrangement with a high-pressure channel and a low-pressure channel, a working connection arrangement with at least one working connection, one directional valve arrangement between the supply channel arrangement and the working connection arrangement and a compensation arrangement, which is acted upon by a pressure in a load-sensing arrangement that includes at least one load-sensing pipe section, wherein a load-sensing arrangement of at least one valve module has a pressure influencing arrangement that differs from a pressure influencing arrangement of a load sensing arrangement of another valve module, and wherein in a valve module the compensation arrangement is connected to a load-sensing pipe section and the pressure influencing arrangement has a pressure limiting valve that branches off from the load-sensing main pipe.

6. The valve arrangement according to claim 5, wherein the load-sensing main pipe has a two-way valve for each valve module, the two-way valve passing on the higher pressure from either the valve module or a neighbouring valve module to the load-sensing main pipe, the pressure limiting valve branching off behind the outlet of the two-way valve.

7. The valve arrangement according to claim 5, wherein the pressure control arrangement of one valve module comprises the pressure limiting valve of another valve module branching off from the load-sensing main pipe, said pressure limiting valve being located in a two-way valve cascade in the load-sensing main pipe further below.

8. A hydraulic valve arrangement comprising:

at least two valve modules, each having a supply channel arrangement with a high-pressure channel and a low-pressure channel, a working connection arrangement with at least one working connection, one directional valve arrangement between the supply channel arrangement and the working connection arrangement and a compensation arrangement, which is acted upon by a pressure in a load-sensing arrangement that includes at least one load-sensing pipe section, wherein a load-sensing arrangement of at least one valve module has a pressure influencing arrangement that differs from a pressure influencing arrangement of a load sensing arrangement of another valve module, and wherein the pressure influencing arrangement of a valve module comprises a pressure limiting valve of another valve module that branches off from the load-sensing main pipe, said pressure limiting valve being located in a two-way valve cascade in the load-sensing main pipe further below.

9. A hydraulic valve arrangement comprising:

at least two valve modules, each having a supply channel arrangement with a high-pressure channel and a low-pressure channel, a working connection arrangement with at least one working connection, one directional valve arrangement between the supply channel arrangement and the working connection arrangement and a compensation arrangement, which is acted upon by a pressure in a load-sensing arrangement that includes at least one load-sensing pipe section, wherein a load-sensing arrangement of at least one valve module has a pressure influencing arrangement that differs from a pressure influencing arrangement of a load sensing arrangement of another valve module, and wherein in a valve module with two working connections a load-sensing pipe section is allocated to each working connection and the load-sensing pipe sections are connected to the compensation arrangement via a two-way valve, the pressure influencing arrangement having a pressure limiting valve that branches off from a pipe from the outlet of the two-way valve.

10. A hydraulic valve arrangement comprising:

at least two valve modules, each having a supply channel arrangement with a high-pressure channel and a low-pressure channel, a working connection arrangement with at least one working connection, one directional valve arrangement between the supply channel arrangement and the working connection arrangement and a compensation arrangement, which is acted upon by a pressure in a load-sensing arrangement that includes at least one load-sensing pipe section, wherein a load-sensing arrangement of at least one valve module has a pressure influencing arrangement that differs from a pressure influencing arrangement of a load sensing arrangement of another valve module, wherein at least one valve module has two working connections and has a load-sensing pipe section allocated to each working connection, and also has (a) a pressure influencing arrangement that includes a pressure limiting valve in each load-sensing pipe section, or (b) a load-sensing arrangement that includes a two-way valve that connects the two load-sensing pipe sections to the compensation arrangement, and a pressure influencing arrangement that includes a pressure limiting valve connected to the two-way valve; and a load-sensing main pipe that extends through all valve modules and includes an associated two-way valve in each valve module, each associated two-way valve passing on to the load-sensing main pipe the higher of a load-sensing arrangement pressure from its own valve module or a load-sensing arrangement pressure from a neighboring valve module, wherein at least one valve module has a compensation arrangement that is connected to a load-sensing pipe section, and has a pressure influencing arrangement that includes a pressure limiting valve that branches from the load-sensing main pipe behind the outlet of one of the associated two-way valves.

* * * * *